US006321841B1

(12) United States Patent
Eoff et al.

(10) Patent No.: US 6,321,841 B1
(45) Date of Patent: Nov. 27, 2001

(54) METHODS OF SEALING PIPE STRINGS IN DISPOSAL WELLS

(75) Inventors: Larry S. Eoff; Jiten Chatterji, both of Duncan; Roger S. Cromwell, Walters; Bobby J. King, Duncan, all of OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/789,446

(22) Filed: Feb. 21, 2001

(51) Int. Cl.$^7$ ............................. E21B 33/14; E21B 33/16
(52) U.S. Cl. ..................... 166/291; 166/295; 166/300; 166/902; 405/129.35; 405/266
(58) Field of Search ..................... 166/285, 291, 166/295, 300, 902; 405/129.35, 129.4, 266; 523/130; 588/17, 250

(56) References Cited

U.S. PATENT DOCUMENTS

| | | |
|---|---|---|
| 2,815,079 | 12/1957 | Goins, Jr. et al. . |
| 3,082,823 | 3/1963 | Hower . |
| 3,208,525 | 9/1965 | Caldwell et al. . |
| 3,308,884 | 3/1967 | Robichaux . |
| 3,310,111 | 3/1967 | Pavlich et al. . |
| 3,310,511 | 3/1967 | Reinert . |
| 3,416,604 | 12/1968 | Rensvold . |
| 3,467,208 | 9/1969 | Kelly, Jr. ............................. 175/75 |
| 3,612,181 | 10/1971 | Brooks, Jr. ......................... 166/295 |
| 3,705,116 | 12/1972 | Vargin et al. . |
| 3,750,768 | 8/1973 | Suman, Jr. et al. .................. 175/72 |
| 3,763,070 | 10/1973 | Shearing . |
| 3,769,250 | 10/1973 | Nikles, Jr. et al. . |
| 3,782,466 | 1/1974 | Lawson et al. . |
| 3,894,977 | 7/1975 | Brown et al. . |
| 3,933,204 | 1/1976 | Knapp ................................ 166/295 |
| 3,960,801 | 6/1976 | Cole et al. . |
| 3,976,135 | 8/1976 | Anderson ........................... 166/276 |
| 4,042,031 | 8/1977 | Knapp ................................ 166/276 |
| 4,042,032 | 8/1977 | Anderson ........................... 166/276 |
| 4,072,194 | 2/1978 | Cole et al. .......................... 166/295 |
| 4,101,474 | 7/1978 | Copeland et al. . |
| 4,107,112 | 8/1978 | Latta, Jr. et al. . |
| 4,113,015 | 9/1978 | Meijs ................................. 166/295 |
| 4,127,173 | 11/1978 | Warkins et al. .................... 166/276 |
| 4,189,002 | 2/1980 | Martin ............................... 166/295 |
| 4,199,484 | 4/1980 | Murphey . |
| 4,215,001 | 7/1980 | Elphingstone et al. . |
| 4,216,829 | 8/1980 | Murphey ............................ 166/276 |
| 4,220,566 | 9/1980 | Constein et al. . |
| 4,272,384 | 6/1981 | Martin . |
| 4,336,842 | 6/1982 | Graham et al. .................... 166/276 |
| 4,339,000 | 7/1982 | Cronmiller ......................... 166/295 |
| 4,367,300 | 1/1983 | Aoki et al. ............................ 524/2 |
| 4,368,136 | 1/1983 | Murphey ............................ 252/316 |
| 4,477,626 | 10/1984 | Suzuki .............................. 524/862 |
| 4,483,888 | 11/1984 | Wu .................................... 427/336 |
| 4,489,785 | 12/1984 | Cole ................................. 166/295 |
| 4,532,052 | 7/1985 | Weaver et al. . |
| 4,537,918 | 8/1985 | Parcevaux et al. ................. 523/130 |
| 4,558,075 | 12/1985 | Suss et al. ......................... 523/216 |

(List continued on next page.)

FOREIGN PATENT DOCUMENTS

| | | |
|---|---|---|
| 0 553 566 A1 | 12/1992 | (EP) . |
| 0 802 253 A1 | 10/1997 | (EP) . |
| 1315462 | 12/1962 | (FR) . |
| 0 91 377 A1 | 4/1983 | (FR) . |
| 1019122 | 2/1966 | (GB) . |
| WO 91/02703 | 3/1991 | (WO) . |
| WO 94/12445 | 6/1994 | (WO) . |

OTHER PUBLICATIONS

Abstract No. 127:209378 dated Jul. 30, 1997.
Abstract No. 115:216962 entitled "Conditioning of Spent Ion Exchange Resins By Embedding In Compound Matrixes", by C.J. Kertesz; Waste Management, Tucson, AZ, 1991, vol. 2, pp. 381–386.
Abstract No. XP002146282 dated Oct. 15, 1982; Derwent Publications, Ltd.
Abstract No. XP002146283 dated Oct. 12, 1977; Derwent Publications, Ltd.
Abstract No. XP002145741 dated Mar. 12, 1996; Derwent Publications, Ltd.
Abstract No. XP002145742 dated Apr. 15, 1993; Derwent Publications, Ltd.
Abstract No. 118:21769 dated Jan. 13, 1993.
Abstract No. 118:239641 dated Feb. 09, 1993.
Abstract No. 129:179103 entitled "Hihg–Strength Cement Hardened Bodies With Water Resistance and Its Manufacturing Method" by Yoshihiko Oohama.
Abstract No. 131:215399 entitled "Biodegradable Polymer Moldings With Good Water Resistance" by Masashi Achinami et al.
Abstract No. 133:21349 entitled "Mixes for Macroporous Concrete" By Marin Stanculescu.
Abstract No. 104:38839 entitled "Use Of An Aqueous Expoxy Resin Emulsion In Preparing Aerated Concrete" by Hermann Volland.
Abstract No. 124:64550 entitled "Hydraulic Composition For High–Strength Polymer Concrete" By Tadao Sakurai.

(List continued on next page.)

*Primary Examiner*—George Suchfield
(74) *Attorney, Agent, or Firm*—Craig W. Roddy; C. Clark Dougherty, Jr.

(57) ABSTRACT

Improved methods of completing wells penetrating subterranean corrosive fluid disposal zones are provided. The methods basically comprise the steps of preparing a pumpable, water compatible, corrosion resistant, hardenable epoxy sealing composition comprised of a hardenable epoxide containing liquid and a hardening agent, placing the epoxy sealing composition in the annulus between a string of pipe and a well bore penetrating a disposal zone and allowing the epoxy sealing composition to harden.

13 Claims, No Drawings

U.S. PATENT DOCUMENTS

| | | | |
|---|---|---|---|
| 4,569,971 | 2/1986 | Sasse et al. | 525/109 |
| 4,620,993 | 11/1986 | Syss et al. | 427/407.1 |
| 4,665,988 | 5/1987 | Murphey et al. | 166/295 |
| 4,718,492 * | 1/1988 | Van Laar | 166/295 |
| 4,741,401 | 5/1988 | Walles et al. | 166/300 |
| 4,767,460 | 8/1988 | Parcevaux et al. | |
| 4,773,482 | 9/1988 | Allison | 166/270 |
| 4,785,884 | 11/1988 | Armbruster | 166/280 |
| 4,829,100 | 5/1989 | Murphey et al. | 523/131 |
| 4,844,164 * | 7/1989 | Shen | 166/291 |
| 4,921,047 | 5/1990 | Summers et al. | 166/276 |
| 4,972,906 | 11/1990 | McDaniel | 166/276 |
| 5,090,478 | 2/1992 | Summers | 166/278 |
| 5,095,987 | 3/1992 | Weaver et al. | 166/276 |
| 5,107,928 | 4/1992 | Hilterhaus | 166/293 |
| 5,133,409 | 7/1992 | Bour et al. | 166/293 |
| 5,159,980 | 11/1992 | Onan et al. | 166/294 |
| 5,162,060 | 11/1992 | Bredow et al. | 166/808 |
| 5,168,928 | 12/1992 | Terry et al. | 166/292 |
| 5,211,234 | 5/1993 | Floyd | 166/276 |
| 5,213,161 | 5/1993 | King et al. | 166/293 |
| 5,228,509 * | 7/1993 | Ungemach et al. | 166/902 X |
| 5,232,741 * | 8/1993 | Wu | 166/902 X |
| 5,232,961 | 8/1993 | Murphey et al. | 523/414 |
| 5,258,072 | 11/1993 | Gopalkirshnan et al. | 106/802 |
| 5,293,938 | 3/1994 | Onan et al. | 166/293 |
| 5,314,023 | 5/1994 | Dartez et al. | 166/295 |
| 5,318,382 * | 6/1994 | Cahill | 405/266 X |
| 5,335,726 | 8/1994 | Rodrigues | 166/295 |
| 5,337,824 | 8/1994 | Cowan | 166/293 |
| 5,358,044 | 10/1994 | Hale et al. | 166/293 |
| 5,358,051 | 10/1994 | Rodrigues | 166/295 |
| 5,361,841 | 11/1994 | Hale et al. | 166/293 |
| 5,361,842 | 11/1994 | Hale et al. | 166/293 |
| 5,363,918 | 11/1994 | Cowan et al. | 166/295 |
| 5,368,102 | 11/1994 | Dewprashad et al. | 166/276 |
| 5,373,901 | 12/1994 | Norman et al. | 166/300 |
| 5,377,757 | 1/1995 | Ng | 166/277 |
| 5,388,648 | 2/1995 | Jordan, Jr. | 166/380 |
| 5,428,178 | 6/1995 | Zuzich et al. | 549/378 |
| 5,458,195 | 10/1995 | Totten et al. | 166/293 |
| 5,547,027 | 8/1996 | Chan et al. | 166/295 |
| 5,559,086 | 9/1996 | Dewprashad et al. | 507/219 |
| 5,588,488 | 12/1996 | Vijn et al. | 166/293 |
| 5,609,207 | 3/1997 | Dewprashad | 166/276 |
| 5,688,844 | 11/1997 | Chatterji et al. | 524/8 |
| 5,692,566 | 12/1997 | Surels | 166/295 |
| 5,712,314 | 1/1998 | Surles et al. | 521/41 |
| 5,738,463 | 4/1998 | Onan | 405/154 |
| 5,795,924 | 8/1998 | Chatterji et al. | 523/130 |
| 5,820,670 | 10/1998 | Chatterji et al. | 106/727 |
| 5,873,413 | 2/1999 | Chatterji et al. | 166/293 |
| 5,875,844 | 3/1999 | Chatterji et al. | 166/293 |
| 5,875,845 | 3/1999 | Chatterji et al. | 166/293 |
| 5,875,846 | 3/1999 | Chatterji et al. | 166/293 |
| 5,911,282 | 6/1999 | Onan et al. | 175/72 |
| 5,913,364 | 6/1999 | Sweatman | 166/281 |
| 5,957,204 | 9/1999 | Chatterji et al. | 166/295 |
| 5,969,006 | 10/1999 | Onan et al. | 523/166 |
| 6,006,835 | 12/1999 | Onan et al. | 166/295 |
| 6,006,836 | 12/1999 | Chatterji et al. | 166/295 |
| 6,059,035 | 5/2000 | Chatterji et al. | 166/293 |
| 6,098,711 | 8/2000 | Chatterji et al. | 166/294 |
| 6,124,246 | 9/2000 | Heathman et al. | 507/219 |
| 6,231,664 | 5/2001 | Chatterji et al. | 106/724 |
| 6,234,251 | 5/2001 | Chatterji et al. | 166/295 |
| 6,244,344 | 6/2001 | Chatterji et al. | 166/295 |

OTHER PUBLICATIONS

Abstract No. 125:283143 entitled "Rapid Hardening Cement–Epoxy Resin Compositions With Segregation Prevention" by Jinichi Omi.

Abstract No. 78:137411 entitled "Hardenable Resin Compositions" by Hiroshi Komoto.

Abstract No. 93:119277 entitled "Binder Mixture For Mortar" by Karl Hermann Conrad et al.

Abstract No. 102:208395 entitled "Chemical Admixtures For Cement".

* cited by examiner

METHODS OF SEALING PIPE STRINGS IN DISPOSAL WELLS

BACKGROUND OF THE INVENTION

1. Field of the Invention

The present invention relates generally to improved methods of sealing pipe strings in well bores penetrating subterranean corrosive fluid disposal zones.

2. Description of the Prior Art

Hydraulic cement compositions are commonly utilized as sealants in well completion operations whereby strings of pipe such as casing and liners are sealed in well bores. In performing such operations, a cement composition is pumped into the annular space between the walls of a well bore and the exterior surfaces of a pipe string disposed therein. The cement composition is permitted to set in the annular space thereby forming an annular sheath of hardened substantially impermeable cement therein. The cement sheath supports and positions the pipe string in the well bore and bonds the exterior surfaces of the pipe string to the walls of the well bore whereby the undesirable migration of fluids between zones or formations penetrated by the well bore is prevented.

Corrosive waste fluids such as salt water, acidic materials, caustic materials, organic materials, chemical byproduct materials and the like are often disposed of by injecting them into disposal wells. Such disposal wells penetrate subterranean formations which accept large volumes of waste fluids and are naturally separated from other subterranean formations. When a disposal well is completed whereby a string of steel pipe is cemented in the well bore utilizing a hydraulic cement composition, both the set cement and steel pipe are often subjected to severe corrosion. A result of such corrosion in disposal wells can be that the waste fluids leak into and contaminate formations containing useful fluids such as hydrocarbons or potable water.

In order to prevent the corrosion of metal pipe strings in disposal wells, it has heretofore been the practice to seal the pipe strings in the well bores with hardenable epoxy resin sealing compositions. The epoxy resin sealing compositions utilized have been highly resistant to degradation by acids and other corrosive fluids which reduces the corrosion of metal pipe strings and the chances that corrosive fluids will find their way to the surface or into other subterranean locations. However, the hardened epoxy resin sealing compositions have often lacked sufficient resiliency as well as the necessary bond strength to resist loss of pipe and/or formation bond and cracking or shattering as a result of pipe movements caused by expansion, contraction, impacts or shocks. In addition, the epoxy resin sealing compositions utilized heretofore have been intolerant to contact with water. That is, the epoxy resin sealing compositions have contained epoxy resins which are incompatible with water whereby when the compositions are contacted with water, premature hardening of the compositions or other adverse conditions result. Consequently, the epoxy resin sealing compositions have heretofore required the use of oil based pre-flushes and displacement fluids to prevent contact of the compositions with water. The use of such preflushes and displacement fluids is costly and time consuming. Also, even when oil based pre-flushes and displacement fluids are used, water contact with the epoxy resin sealing compositions often takes place causing problems or failures in the sealing operations.

Thus, there are needs for improved methods of sealing pipe strings in disposal wells whereby corrosion resistant, hardenable epoxy sealing compositions are utilized which are compatible with water and also have the resiliencies and high bond strengths required to withstand pipe movements without failure.

SUMMARY OF THE INVENTION

The present invention provides improved methods of sealing a pipe string in the well bore of a disposal well that penetrates a subterranean corrosive fluid disposal zone which meet the needs described above and overcome the deficiencies of the prior art. A method of the invention is basically comprised of the following steps. A pumpable, water compatible, corrosion resistant, hardenable epoxy sealing composition is prepared which can be displaced by or otherwise contacted with water or a water containing fluid without the occurrence of premature hardening or other adverse result comprised of a hardenable epoxide containing liquid and a hardening agent for the epoxide containing liquid. Thereafter, the epoxy sealing composition is placed in the annulus between a pipe string and the walls of a well bore penetrating a subterranean corrosive fluid disposal zone and allowed to harden therein.

In order to reduce the cost of completing a disposal well in accordance with this invention, the portion of the pipe string within the subterranean zone in which corrosive fluids are to be disposed of is sealed with the epoxy sealing composition of this invention while one or more other portions of the pipe string are sealed with a less expensive hydraulic cement composition. Thus, another improved method of the present invention is comprised of the following steps. A pumpable, water compatible, corrosion resistant, hardenable epoxy sealing composition is prepared and a hydraulic cement sealing composition is also prepared. The hydraulic cement sealing composition is displaced with the epoxy sealing composition into and through the annulus between a string of pipe and the portion of the well bore penetrating the subterranean corrosive fluid disposal zone. The displacement is stopped when the epoxy sealing composition spans the annulus between the string of pipe and the portion of the well bore penetrating the subterranean corrosive fluid disposal zone and the displaced hydraulic cement composition spans the annulus between the string of pipe and another portion of the well bore. Thereafter, the hardenable epoxy sealing composition is allowed to harden and the hydraulic cement sealing composition is allowed to set.

The hardenable epoxy sealing compositions of this invention comprised of a water compatible, hardenable epoxide containing liquid and a hardening agent can also include a particulate filler and one or more organosilane compounds which provide bond strength to the hardened composition.

It is, therefore, a general object of the present invention to provide improved methods of completing corrosive fluid disposal wells.

Other and further objects, features and advantages of the present invention will be readily apparent to those skilled in the art upon a reading of the description of preferred embodiments which follows.

DESCRIPTION OF PREFERRED EMBODIMENTS

The present invention provides improved methods of completing disposal wells, i.e., methods of sealing pipe strings in a well bore penetrating a subterranean zone into which corrosive fluids are to be disposed of (hereinafter referred to as a "subterranean corrosive fluid disposal zone"). In accordance with the present invention, a pumpable, corrosion resistant, hardenable epoxy sealing composition which can be displaced by or otherwise contacted with water or a water containing fluid without the occurrence of premature hardening or other adverse result is utilized. Upon hardening, the epoxy sealing composition can withstand the effects of contact with corrosive fluids as well as pipe movements due to expansion, contraction, impacts, shocks and the like.

In accordance with a method of this invention, a pumpable, water compatible, corrosion resistant, hardenable epoxy sealing composition which hardens into a resilient solid impermeable mass is prepared, placed in the annulus between a pipe string and the walls of a well bore penetrating a subterranean corrosive fluid disposal zone and allowed to harden therein. The hardenable, corrosion resistant, epoxy sealing compositions which are useful in accordance with this invention are comprised of a water compatible, hardenable epoxide containing liquid or a mixture of such liquids and a hardening agent for the epoxide containing liquid. The hardenable epoxy sealing compositions are compatible with water so that they can be displaced by or otherwise contacted with water without the occurrence of premature hardening or other adverse result. The epoxy sealing compositions preferably also include a particulate filler and/or one or more organosilane compounds to enhance their resiliencies and bond strengths after hardening.

While various water compatible epoxide containing liquids can be used, preferred such liquids are the diglycidyl ether of 1,4-butanediol, the diglycidyl ether of neopentylglycol, the diglycidyl ether of cyclohexane dimethanol and mixtures of two or more of such liquids. A suitable water compatible epoxide containing liquid comprised of the diglycidyl ether of 1,4-butanediol is commercially available from the Shell Chemical Company under the trade name "HELOXY® 67." This epoxide containing liquid has a viscosity at 25° C. in the range of from about 13 to about 18 centipoises, a molecular weight of 202 and a 1 gram equivalent of epoxide per about 120 to about 130 grams of the liquid. A suitable water compatible diglycidyl ether of neopentylglycol is commercially available from the Shell Chemical Company under the tradename "HELOXY® 68." This epoxide containing liquid has a viscosity at 25° C. in the range of from about 13 to about 18 centipoises, a molecular weight of 216 and a 1 gram equivalent of epoxide per about 130 to about 140 grams of the liquid. A suitable water compatible diglycidyl ether of cyclohexane dimethanol is commercially available from the Shell Chemical Company under the tradename "HELOXY® 107." This epoxide containing liquid has a viscosity at 25° C. in the range of from about 55 to about 75 centipoises, a molecular weight of 256 in a 1 gram equivalent of epoxide per about 155 to about 165 grams of the liquid.

The water compatible epoxide containing liquid or mixture of such liquids is generally present in the epoxy sealing compositions of this invention in an amount in the range of from about 60% to about 85% by weight of the compositions.

A variety of hardening agents can be utilized in the hardenable epoxy sealing composition including, but not limited to, aliphatic amines, aromatic amines, amide amines, amido amines, imadazoles, carboxylic acid anhydrides and mixtures of two or more of such hardening agents. Of these, aliphatic amines, aromatic amines and carboxylic acid anhydrides are the most suitable.

Examples of aliphatic and aromatic amine hardening agents include, but are not limited to, triethylenetetraamine, ethylenediamine, N-cocoalkyltrimethylenediamine, isophoronediamine, diethyltoluenediamine and tris (dimethylaminomethylphenol). Examples of suitable carboxylic acid anhydrides are methyltetrahydrophthalic anhydride, hexahydrophthalic anhydride, maleic anhydride, polyazelaic polyanhydride and phthalic anhydride. Of these, triethylenetetraamine, ethylenediamine, N-cocoalkyltrimethylenediamine, isophoronediamine, diethyltoluenediamine and tris (dimethylaminomethylphenol) are preferred, with isophoronediamine, diethyltoluenediamine and tris (dimethylaminomethylphenol) being the most preferred.

The hardening agent or agents utilized are generally included in the hardenable epoxy sealing compositions of the present invention in an amount in the range of from about 15% to about 40% by weight of the compositions.

As mentioned above, the epoxy sealing compositions preferably also include a particulate filler such as crystalline silicas, amorphous silicas, clays, iron oxide, calcium carbonate or barite. When such a filler is utilized, it is generally present in the hardenable epoxy sealing composition in an amount in the range of from about 15% to about 150% by weight of the composition.

As also mentioned above, one or more organosilane compounds are preferably included in the hardenable epoxy sealing compositions of this invention to impart high metal pipe surface and formation surface bond strengths to the compositions. The organosilane compound or compounds utilized undergo hydrolysis in the presence of water whereby trialkoxysilanols are formed which dehydrate and produce strong bonds to pipe and formation surfaces. That is, the dehydration results in the formation of bonds with silica in the formation and iron oxide on the pipe.

Suitable organosilane compounds which can be utilized include, but are not limited to, 3-aminopropyltrimethoxysilane, 3-aminopropyltriethoxysilane, N- 2-(aminoethyl)-3-aminopropyltriethoxysilane and 3-glycidoxypropyltrimethoxysilane. Of these, 3-glycidoxypropyltrimethoxysilane is preferred. The organosilane compound or compounds are generally included in the hardenable epoxy sealing compositions of this invention in an amount in the range of from about 0.01% to about 5% by weight of the compositions.

As described above, the pumpable, water compatible, corrosion resistant, hardenable epoxy sealing compositions of this invention can be utilized to seal a pipe string in the portion of a well bore penetrating the subterranean corrosive fluid disposal zone with the remaining portion or portions of the well bore being sealed by a hydraulic cement sealing composition. That is, a hydraulic cement sealing composition can be displaced by and in direct contact with a hardenable epoxy sealing composition of this invention into and through the annulus between the pipe string and the portion of the well bore penetrating the subterranean disposal zone. The displacement is stopped when the hardenable epoxy sealing composition spans the portion of the annulus between the string of pipe and the subterranean disposal zone. The hydraulic cement composition displaced ahead of the hardenable epoxy sealing composition spans the annulus between the string of pipe and another portion of the well bore to be sealed. For example, the hardenable epoxy sealing composition can span the annulus between the pipe string and the subterranean disposal zone with the hydraulic cement composition displaced ahead of the epoxy sealing composition spanning the annulus from a point above the disposal zone to the surface. When required, the epoxy sealing composition can be displaced by and in direct contact with a second portion of the hydraulic cement sealing composition so that the annulus between the pipe string and the well bore below the disposal zone is sealed with hydraulic cement. As will be understood by those skilled in the art, the quantities of the displaced hydraulic cement sealing composition and the hardenable epoxy sealing composition are controlled so that epoxy sealing composition and hydraulic cement sealing composition span desired portions of the annulus between the pipe string and the well bore. After being placed, the hardenable epoxy sealing composition is allowed to harden and the hydraulic cement sealing composition is allowed to set.

The hydraulic cement sealing composition utilized in accordance with this invention generally includes a hydraulic cement and sufficient water to form a pumpable slurry. A variety of hydraulic cements can be used including those comprised of calcium aluminum, silicon, oxygen and/or sulfur which set and harden by reaction with water. Such hydraulic cements include, but are not limited to, Portland cements, pozzolana cements, gypsum cements, high alumina content cements, silica cements, slag cements and high alkalinity cements. Portland cements of the types defined and described in *API Specification For Materials And Testing For Well Cements*, API Specification 10, Fifth Edition, dated Jul. 1, 1990 of the American Petroleum Institute are generally preferred.

The water utilized in the cement composition can be fresh water, salt water, i.e., water containing one or more salts dissolved therein, brine or seawater. The water is present in the cement composition in an amount in the generally range of from about 30% to about 100% by weight of hydraulic cement therein.

As is well understood by those skilled in the art, the hydraulic cement sealing composition can include other well cement additives such as dispersing agents, fluid loss control agents, set retarding agents, set accelerating agents, fillers, weighting materials and the like.

A preferred method of this invention for sealing a pipe string in a well bore penetrating a subterranean corrosive fluid disposal zone is comprised of the following steps: (a) preparing a pumpable, water compatible, corrosion resistant, hardenable epoxy sealing composition which can be displaced by or otherwise contacted with water or a water containing fluid without the occurrence of premature hardening or other adverse result comprising a water compatible, hardenable epoxide containing liquid and a hardening agent for the epoxide containing liquid; (b) placing the epoxy sealing composition in the annulus between the string of pipe and the well bore penetrating the disposal zone; and (c) allowing the epoxy sealing composition to harden.

Another improved method of the present invention for sealing a pipe string in a well bore penetrating a subterranean corrosive fluid disposal zone is comprised of the following steps: (a) preparing a pumpable, water compatible, corrosion resistant, hardenable epoxy sealing composition which can be displaced by or otherwise contacted with water or a water containing fluid without the occurrence of premature hardening or other adverse result comprising a water compatible, hardenable epoxide containing liquid and a hardening agent for the epoxide containing liquid; (b) preparing a hydraulic cement sealing composition comprised of hydraulic cement and water; (c) displacing the hydraulic cement sealing composition with the hardenable epoxy sealing composition into and through the annulus between the string of pipe and the portion of the well bore penetrating the subterranean corrosive fluid disposal zone whereby the hardenable epoxy sealing composition spans the portion of the annulus between the string of pipe and the subterranean corrosive fluid disposal zone and the displaced hydraulic cement composition spans the annulus between the string of pipe and another portion of the well bore; and (d) allowing the hardenable epoxy sealing composition to harden and the hydraulic cement sealing composition to set.

The water compatible, hardenable epoxide containing liquid is preferably selected from the group of the diglycidyl ether of 1,4butanediol, the diglycidyl ether of neopentylglycol, the diglycidyl ether of cyclohexane dimethanol or mixtures thereof.

The hardening agent is preferably selected from the group of isophoronediamine, diethyltoluenediamine, tris (dimethylaminomethylphenol) and mixtures thereof. In addition, the epoxy sealing composition preferably includes a particulate filler selected from the group of crystalline silicas, amorphous silicas, clays, calcium carbonate and barite as well as an organosilane compound selected from the group of 3-aminopropyltrimethoxysilane, 3-aminopropyltriethoxysilane, N-2-(aminoethyl)-3-aminopropyltriethoxysilane and 3-glycidyloxypropyltrimethoxysilane.

The hydraulic cement is preferably Portland cement and the water can be fresh water, salt water, brine or seawater.

In order to further illustrate the methods and compositions of this invention, the following examples are given.

EXAMPLE 1

Hardenable epoxy sealing compositions of this invention were prepared comprised of a hardenable, water compatible epoxide containing liquid, i.e., the diglycidyl ether of cyclohexane dimethanol and a hardening agent, i.e., diethyltoluenediamine or a mixture of diethyltoluenediamine and tris (dimethylaminomethylphenol). Test portions of the epoxy sealing compositions were mixed with various quantities of water and the mixtures were tested for thickening time (the times required for the mixtures to reach viscosities of 100 Bc) at various temperatures in accordance with *API Specification 10 of the American Petroleum Institute,* $5^{th}$ Edition, Jul. 1, 1990. The results of the tests as well as the components of the test mixtures and their quantities are set forth in Table I below.

TABLE I

Thickening Times Of Sealing Compositions Of This Invention Water Mixtures

| Epoxide Containing Liquid,[1] parts by weight | First Hardening Agent,[2] parts by weight | Second Hardening Agent,[3] parts by weight | Volume Ratio Of Epoxy Sealing Composition To Water, %:% | Temp., °F. | Thickening Time, hrs:min |
|---|---|---|---|---|---|
| 100 | 28 | 10 | 100:0 | 80 | 4:20 |
| 100 | 28 | 10 | 90:10 | 80 | 5:20 |
| 100 | 28 | 10 | 75:25 | 80 | 4:00 |
| 100 | 28 | 10 | 50:50 | 80 | 7:00[4] |
| 100 | 28 | 10 | 95:5 | 80 | 4:03 |
| 100 | 28 | 10 | 99:1 | 80 | 4:30 |
| 100 | 28 | 10 | 100:0 | 110 | 2:00 |
| 100 | 28 | 5 | 100:0 | 110 | 3:50 |

TABLE I-continued

Thickening Times Of Sealing Compositions Of This Invention Water Mixtures

| Epoxide Containing Liquid,[1] parts by weight | First Hardening Agent,[2] parts by weight | Second Hardening Agent,[3] parts by weight | Volume Ratio Of Epoxy Sealing Composition To Water, %:% | Temp., °F. | Thickening Time, hrs:min |
|---|---|---|---|---|---|
| 100 | 28 | 5 | 75:25 | 110 | 7:00[4] |
| 100 | 28 | 2.5 | 100:0 | 160 | 4:50 |
| 100 | 28 | 2.5 | 75:25 | 160 | 5:00[4] |
| 100 | 28 | 0 | 100:0 | 200 | 3:50 |
| 100 | 28 | 0 | 75:25 | 200 | 5:00[4] |
| 100 | 28 | 0 | 90:10 | 200 | 4:00[4] |

[1]Diglycidyl ether of cyclohexanedimethanol commercially available from Shell Chemical Company under the trade designation"HELOXY ® 107.
[2]Diethyltoluenediamine.
[3]Tris(dimethylaminomethylphenol).
[4]Showed no significant viscosity at time shown.

From Table I it can be seen that the hardenable epoxy sealing compositions of this invention were unaffected when mixed with water up to about 25% by volume.

EXAMPLE 2

A hardenable prior art sealing composition utilized for sealing disposal wells was prepared comprised of an epoxy resin, i.e., a condensation product of epichlorohydrin and bisphenol A, a hardening agent, i.e., 2-ethyl-4-methyl imidazole, an organosilane compound, i.e., N-2-(aminoethyl)-3-aminopropyltriethoxysilane and a particulate filler comprised of micro sand or silica flour. Test portions of the epoxy resin sealing composition were mixed with various quantities of water and the mixtures were tested for thickening time and 140° F. The results of the tests as well as the components of the test mixtures and their quantities are set forth in Table II below.

TABLE II

Thickening Times Of Prior Art Sealing Compositions-Water Mixtures

| Epoxy Resin,[1] parts by weight | Hardening Agent,[2] parts by weight | Organosilane Compound,[3] parts by weight | Micro Sand, parts by weight | Silica Flour, parts by weight | Volume Ratio Of Epoxy Resin Sealing Composition To Water, %:% | Temp., °F. | Thickening Time hrs:min |
|---|---|---|---|---|---|---|---|
| 100 | 1.46 | 0.46 | 109 | — | 100:0 | 140 | 3:40 |
| 100 | 1.46 | 0.46 | 109 | — | 92:8 | 140 | gelled[4] |
| 100 | 1.46 | 0.46 | – | 109 | 92:8 | 140 | gelled[4] |

[1]Condensation product of epichtorohydrin and bisphenol A commercially available from Shell Chemical Company under the trade designation "EPON-828 ® ."
[2]2-ethyl-4-methyl imidazole.
[3]N-2-(aminoethyl)-3-aminopropyltriethoxysilane.
[4]The epoxy resin sealing composition gelled immediately upon being mixed with water.

From Table II it can be seen that the epoxy resin sealing composition of the prior art is incompatible with water.

Thus, the present invention is well adapted to carry out the objects and attain the features and advantages mentioned as well as those which are inherent therein. While numerous changes may be made by those skilled in the art, such changes are encompassed within the spirit of this invention as defined by the appended claims.

What is claimed is:

1. An improved method of sealing a pipe string in a well bore penetrating a subterranean corrosive fluid disposal zone comprising the steps of:

(a) preparing a pumpable, water compatible, hardenable epoxy sealing composition which can be displaced or otherwise contacted with water or a water containing fluid without the occurrence of premature hardening or other adverse result comprising a hardenable epoxide containing liquid and a hardening agent for said epoxide containing liquid;

(b) preparing a hydraulic cement sealing composition comprised of hydraulic cement and water;

(c) displacing said hydraulic cement sealing composition with said hardenable epoxy sealing composition into and through the annulus between said string of pipe and the portion of said well bore penetrating said subterranean corrosive fluid disposal zone whereby said hardenable epoxy sealing composition spans the portion of said annulus between said string of pipe and said subterranean corrosive fluid disposal zone and said displaced hydraulic cement composition spans the annulus between said string of pipe and another portion of said well bore; and (d) allowing said hardenable epoxy sealing composition to harden and said hydraulic cement sealing composition to set.

2. The method of claim 1 wherein said hardenable epoxide containing liquid is selected from the group consisting of the diglycidyl ether of 1,4-butanediol, the diglycidyl ether of neopentylglycol, the diglycidyl ether of cyclohexane dimethanol and mixtures thereof.

3. The method of claim 1 wherein said hardenable epoxide containing liquid is present in said epoxy sealing composition in an amount in the range of from about 60% to about 85% by weight of said composition.

4. The method of claim 1 wherein said hardening agent in said epoxy sealing composition is at least one member selected from the group consisting of aliphatic amines, aromatic amines, amide amines, amido amines, imidazoles and carboxylic acid anhydrides present in said epoxy sealing composition in an amount in the range of from about 15% to about 40% by weight of said composition.

5. The method of claim 1 wherein said hardening agent in said epoxy sealing composition is at least one member selected from the group consisting of triethylenetetraamine, ethylenediamine, N-cocoalkyltrimethylenediamine, isophoronediamine, diethyltoluenediamine and tris(dimethylaminomethylphenol) present in said epoxy sealing composition in an amount in the range of from about 15% to about 40% by weight of said composition.

6. The method of claim 1 wherein said epoxy sealing composition further comprises a particulate filler present in an amount in the range of from about 15% to about 150% by weight of said composition.

7. The method of claim 6 wherein said particulate filler is selected from the group consisting of crystalline silicas, amorphous silicas, clays, calcium carbonate and barite.

8. The method of claim 1 wherein said epoxy sealing composition further comprises an organosilane compound present in an amount in the range of from about 0.01% to about 5% by weight of said composition.

9. The method of claim 8 wherein said organosilane compound is selected from the group consisting of 3-aminopropyltrimethoxysilane, 3-aminopropyltriethoxysilane, N-2-(aminoethyl)-3-aminopropyltriethoxysilane and 3-glycidoxypropyltrimethoxysilane.

10. The method of claim 1 wherein said hydraulic cement in said hydraulic cement sealing composition is selected from the group of Portland cements, pozzolana cements, gypsum cements, alumina cements, silica cements, slag cements and alkaline cements.

11. The method of claim 10 wherein said hydraulic cement is Portland cement.

12. The method of claim 1 wherein said water in said hydraulic cement sealing composition is comprised of fresh water, salt water, brine or seawater.

13. The method of claim 12 wherein said water is present in said hydraulic cement sealing composition in an amount in the range of from about 30% to about 100% by weight of cement in said composition.

* * * * *